United States Patent
Ragot et al.

(10) Patent No.: US 7,093,488 B2
(45) Date of Patent: Aug. 22, 2006

(54) VIBRATING RESONATOR INERTIAL ROTATION SENSOR

(75) Inventors: Vincent Ragot, Asnieres (FR); Alain Renault, Pontoise (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 11/009,082

(22) Filed: Dec. 13, 2004

(65) Prior Publication Data
US 2005/0126289 A1    Jun. 16, 2005

(30) Foreign Application Priority Data
Dec. 11, 2003   (FR) .................................. 03 14511

(51) Int. Cl.
*G01P 9/04*   (2006.01)
(52) U.S. Cl. .................. 73/510; 73/504.04; 73/504.13
(58) Field of Classification Search .................. 73/510, 73/504.13, 504.04, 504.12, 504.15, 1.37, 73/1.38, 1.77, 1.78, 504.14, 1.75
See application file for complete search history.

(56) References Cited

U.S. PATENT DOCUMENTS

| | | | | |
|---|---|---|---|---|
| 4,951,508 A | * | 8/1990 | Loper et al. ............. | 73/504.13 |
| 5,587,529 A | * | 12/1996 | Iguchi et al. ............ | 73/504.13 |
| 5,763,780 A | * | 6/1998 | Matthews et al. ........ | 73/504.13 |
| 5,892,152 A | * | 4/1999 | Darling et al. ........... | 73/504.13 |
| 5,915,276 A | * | 6/1999 | Fell ......................... | 73/504.13 |
| 6,065,340 A | * | 5/2000 | Matthews et al. ........ | 73/504.13 |
| 6,189,382 B1 | * | 2/2001 | Johnson ................... | 73/504.13 |
| 6,927,568 B1 | * | 8/2005 | Nozoe et al. ............ | 324/207.25 |

FOREIGN PATENT DOCUMENTS

| | | |
|---|---|---|
| EP | 0859218 A3 | 8/1998 |
| EP | 1015849 | 7/2000 |
| WO | WO-99/14557 A1 | 3/1999 |
| WO | WO-00/45127 A1 | 8/2000 |

* cited by examiner

*Primary Examiner*—Hezron Williams
*Assistant Examiner*—Jacques Saint Surin
(74) *Attorney, Agent, or Firm*—Birch, Stewart, Kolasch & Birch, LLP.

(57) ABSTRACT

The inertial rotation sensor comprising a vibrating resonator associated with transducers defining a pair of control channels and a pair of detection channels, preferably comprises a single multiplexer member for all of the channels, the multiplexer member being associated with a processing unit generating cycles comprising control action times on each control channel followed by detection action times on each detection channel, with two succession action times being separated by a relaxation time.

5 Claims, 1 Drawing Sheet

VIBRATING RESONATOR INERTIAL ROTATION SENSOR

The present invention relates to a vibrating resonator inertial rotation sensor.

BACKGROUND OF THE INVENTION

Inertial rotation sensors are known that comprise a vibrating resonator, which resonator may either be a vibrating bell or else a Quapason (a configuration of four vibrating beams), associated with transducers defining a pair of control channels and a pair of detection channels. With existing sensors, each of the channels is connected to a processing system that is dedicated to that channel, and because of the differences in performance that exist between the components making up the processing system, there exists a degree of anisotropy in the processing performed on the various channels. This anisotropy leads to sensor drift due to gain and phase errors accumulating while the sensor is in use.

Document WO 00/45127 discloses a vibrating resonator inertial rotation sensor in which four channels are used in alternation for control and detection purposes, using time division multiplexing. For control purposes, each channel receives an individual excitation signal, while for detection purposes the channels are connected in pairs to two distinct differential amplifiers. Thus both in control and in detection, differences exist in the ways the channels are processed.

Document EP 0 859 218 discloses a vibrating resonator inertial rotation sensor including a multiplexer member for combining four separately-generated control signals. Each control signal is thus generated with its own gain such that the resulting gain of the signal that is applied to each of the various control electrodes varies depending on the electrode in question. The detection signals are also processed separately.

OBJECT OF THE INVENTION

An object of the invention is to propose a vibrating resonator inertial rotation sensor that minimizes drift associated with using the sensor.

BRIEF DESCRIPTION OF THE INVENTION

In order to achieve this object, the invention provides an inertial rotation sensor comprising a vibrating resonator associated with transducers defining a pair of control channels and a pair of detection channels, a multiplexer member for the pair of control channels and a multiplexer member for the pair of detection channels, and a single processing system associated with each multiplexer member.

Thus, all of the control channels receive an excitation signal coming from a common processing system and all of the picked-up detection signals are processed by a common processing system such that any isotropy in the processing of each of the pairs of channels is eliminated, thereby improving sensor performance.

Preferably, the sensor has a single multiplexer member associating the two pairs of channels with a single processing unit and operates by multiplexing over all of the control and detection channels. This eliminates not only anisotropy within a pair of channels, but also crosstalk between control and detection so that the performance of the sensor is further improved.

According to yet another aspect of the invention, the processing unit implements relaxation times separating the action times so that at least one detection action time is preceded by a relaxation time. This minimizes crosstalk between control and detection. Preferably, all of the action times are separated by relaxation times. This optimizes decorrelation between the various action times.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and in which.

DETAILED DESCRIPTION OF THE INVENTION

Figure 1:
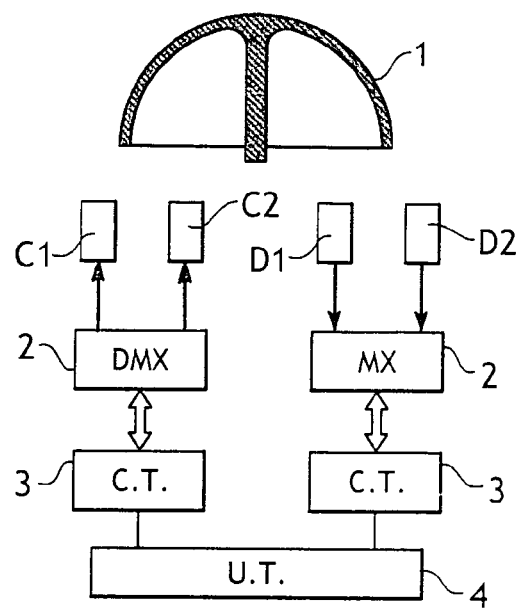
FIG. 1 is a diagram of a first embodiment of the sensor of the invention.

With reference to FIG. 1, the inertial rotation sensor comprises in conventional manner a vibrating resonator 1 represented in the figure by a vibrating bell, although the vibrating resonator could have other forms, and in particular it could be in the form of a Quapason. The vibrating resonator 1 is associated with transducers defining a pair of control channels C1 and C2 and a pair of detection channels D1 and D2. Although each channel is represented in FIG. 1 by a single block, each channel generally comprises a plurality of transducers. In particular, for a vibrating bell, each channel generally comprises at least two transducers formed by airgaps between a metal layer carried by the vibrating bell and biased by a direct current (DC) voltage, and electrodes placed facing the edge of the vibrating bell, whereas in a sensor comprising a Quapason, each channel generally has four piezoelectric transducers.

In the first embodiment of the invention as shown in FIG. 4, each pair of channels is associated with a multiplexer member 2, and more precisely with a demultiplexer for the control channels C1 and C2 and with a multiplexer for the detection channels D1 and D2. Each multiplexer member 2 is connected to a processing system 3. The processing system 3 associated with the control channels C1 and C2 uses a single generator from which it produces a control signal that is multiplexed and transmitted to the corresponding multiplexer 2, while the processing system 3 associated with the detection channels D1 and D2 serves to demultiplex the signal received from the multiplexer 2 and to process it so as to prepare a digital processed signal. The processing systems 3 are connected to a processing unit 4 which uses the detection signals to compute the movements to which the sensor is subject, and to generate control signals and also clocking signals for the multiplexer members.

According to an aspect of the invention, multiplexing is preferably performed by using relaxation times to separate control action times from detection action times, and to separate action times from one another. Preferably, each cycle generated by the processing unit comprises control action times on each of the control channels followed by detection action times on each of the detection channels. If an action time of the first control channel is written c1, an action time on the second control channel is written c2, an action time on the first detection channel is written d1, an action time on the second detection channel is written d2, and a relaxation time is written r, each cycle thus preferably comprises the following sequence: c1-r-c2-r-d1-r-d2-r, thereby optimally reducing crosstalk between the control channels, between the detection channels, and also between the control channels and the detection channels. In this respect, it should be observed that the action times and the relaxation times are not necessarily of the same duration. Typically, control action times may be provided with a duration of 50 microseconds (μs), detection times with a duration of 120 μs, and relaxation times with a duration of 2 μs, which makes it possible to obtain crosstalk of less than $10^{-6}$.

Figure 2:
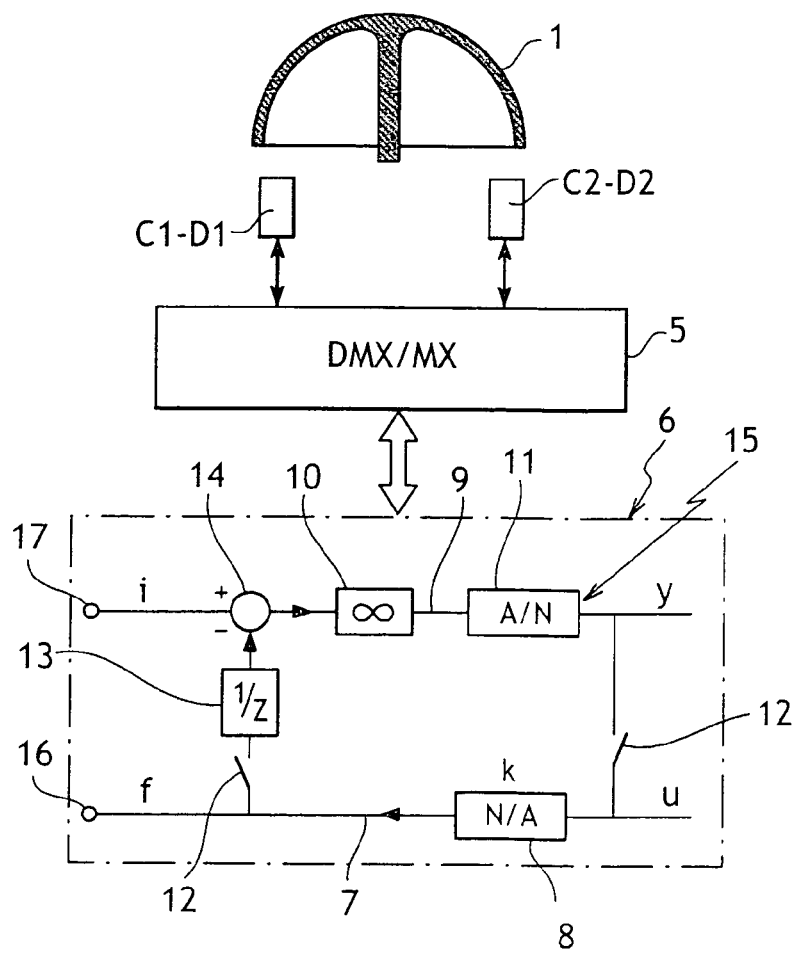
FIG. 2 is a diagram analogous to FIG. 1, showing a second embodiment of the invention.

FIG. 2 shows a preferred embodiment of the invention in which the transducers C1-D1 and C2-D2 operate alternatively for control and for detection purposes, being associated with a single multiplexer member 5 for all of the control and detection channels. The multiplexer member 5 serves in alternation to demultiplex the control signals and to multiplex the detection signals. Under which circumstances, the single multiplexing member 5 is connected to a single processing unit 6, preferably having a processing system 15 serving both to generate the control signal and to analyze the detection signal. For this purpose, in the preferred embodiment, the processing system 15 comprises a control branch 7 having a digital-to-analog converter 8 with a gain k which transforms a digital control unit u into an analog control signal f given by the expression f=ku. The signal f is transmitted in alternation via a single terminal 16 to the transducers C1-D1 and C2-D2 during the control action times c1 and c2 of the sensor. The processing circuit further comprises a detection branch 9 comprising an input terminal 17 which receives in alternation the signals from the transducers C1-D1 and C2-D2 during the detection stages d1 and d2 of the sensor. The input terminal 17 is connected to the summing input of a charge amplifier 14 which transforms a current signal i into a voltage signal. The detection branch 9 further comprises a corrector member 10 having gain that is very high and that can be assumed to be infinite, followed by analog-to-digital converter 11. The detection branch 9 is associated with the control branch 7 via switches 12 so as to form a feedback loop which is open during the control action times and closed during the detection action times. The feedback loop also includes a component 13 that performs division by the equivalent impedance of the circuit and that is connected to the inverting terminal of the charge amplifier 14 so that the signal y picked up at the output from the detection branch is representative of the equation y=zi/k, where i represents the current detected by the sensor. It can be seen that the gain error introduced during control by the gain k of the comparator is thus eliminated during detection, thereby enabling the performance of the sensor to be improved and minimizing phase error in quadrature control of the sensor.

Naturally, the invention is not limited to the embodiments described and various embodiments can be applied thereto without going beyond the ambit of the invention as defined by the claims.

In particular, it is possible to use a single multiplexer member 5 as described with reference to FIG. 2, while nevertheless associating said single multiplexer member with separate transducers for the control channels and for the detection channels.

Although the processing cycle is described above in a preferred implementation using a relaxation time between every two successive action times, it is also possible to implement cycles of slightly lower performance that nevertheless reduce crosstalk between control and detection, by providing relaxation times only between a control action time and a following detection action, for example, in application of sequences c1-c2-r-d1-d2 or c1-r-d1-c2-r-d2, using the same notation as above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An inertial rotation sensor comprising a vibrating resonator associated with transducers defining a pair of control channels and a pair of detection channels, the sensor including a multiplexer member for the pair of control channels and a multiplexer member for the pair of detection channels, and a single processing system associated with each multiplexer member, wherein the multiplexer member associates both pairs of channels with a single processing unit, and wherein the processing unit comprises a processing system having a control branch with an analog-to-digital converter and a detection branch with a very high gain corrector member associated with an analog-to-digital converter, and means for associating the control branch with the detection branch in a feedback loop.

2. The sensor according to claim 1, including a processing unit generating relaxation times separating action times in such a manner that at least one detection action time is preceded by a relaxation time.

3. The sensor according to claim 2, wherein the processing unit generates cycles comprising control action times on each of the control channels followed by detection action times on each of the detection channels.

4. The sensor according to claim 3, wherein all of the action times are separated from one another by relaxation times.

5. The sensor according to claim 1, wherein the control channels and the detection channels have transducers in common.

* * * * *